United States Patent Office 3,003,368
Patented Oct. 10, 1961

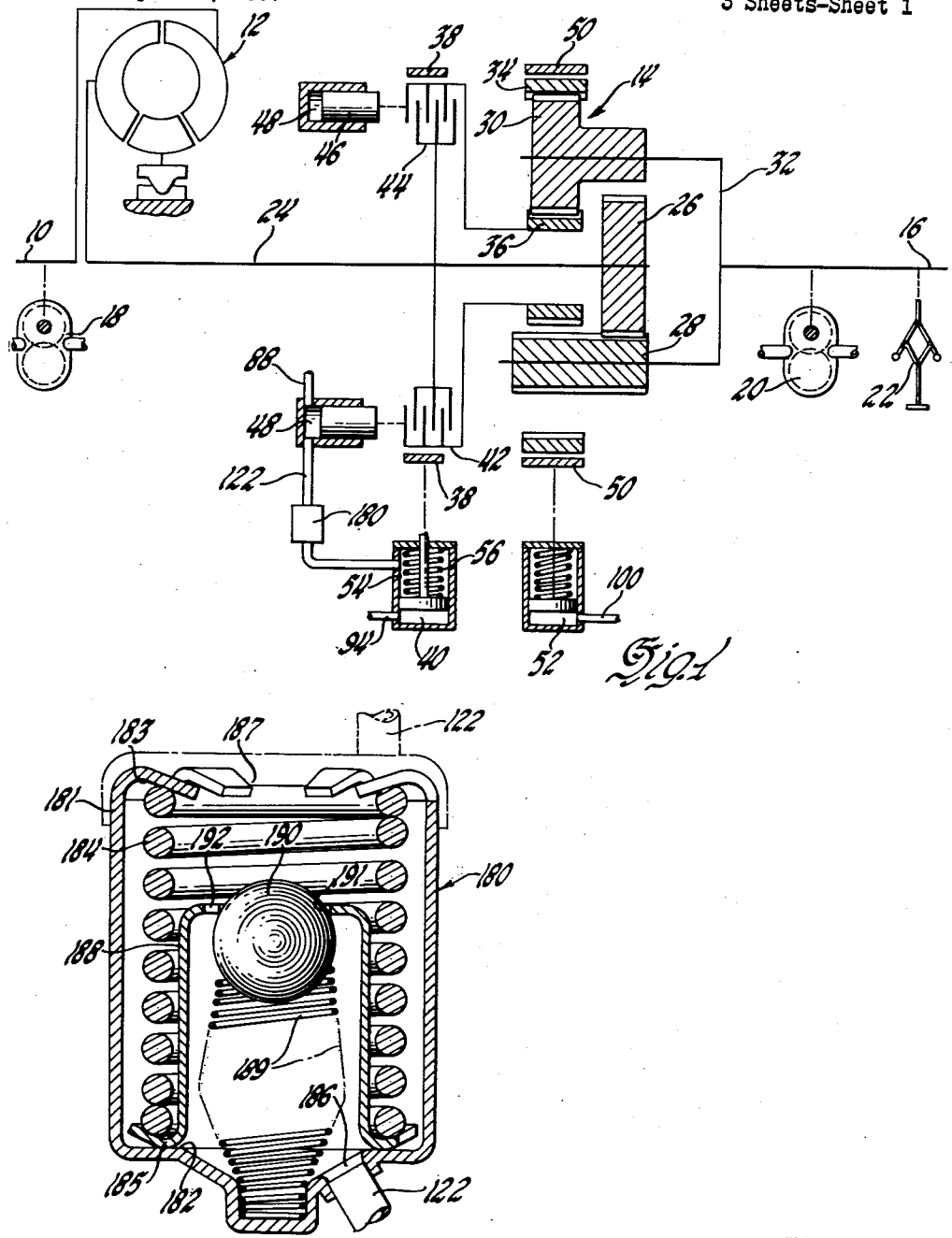

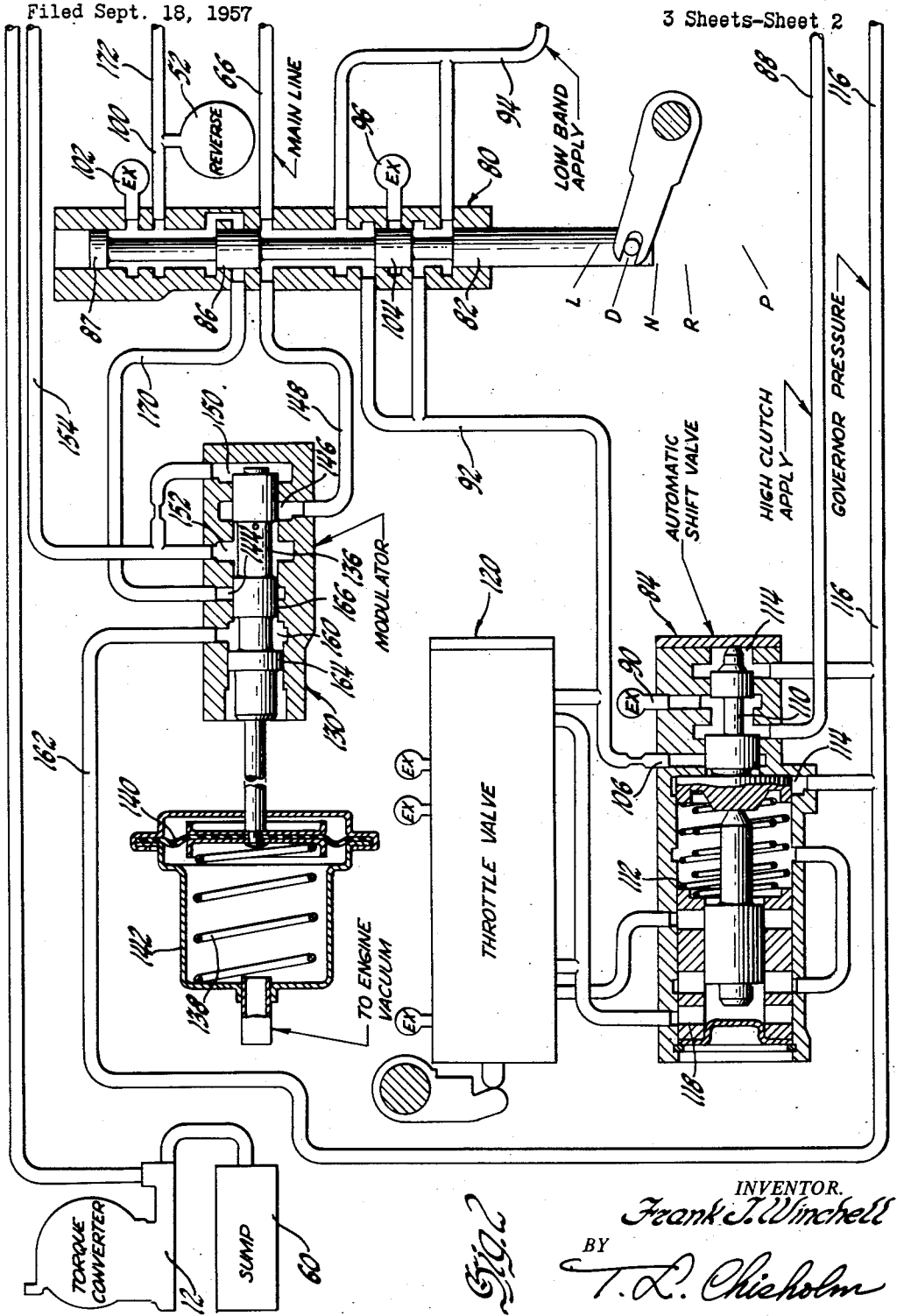

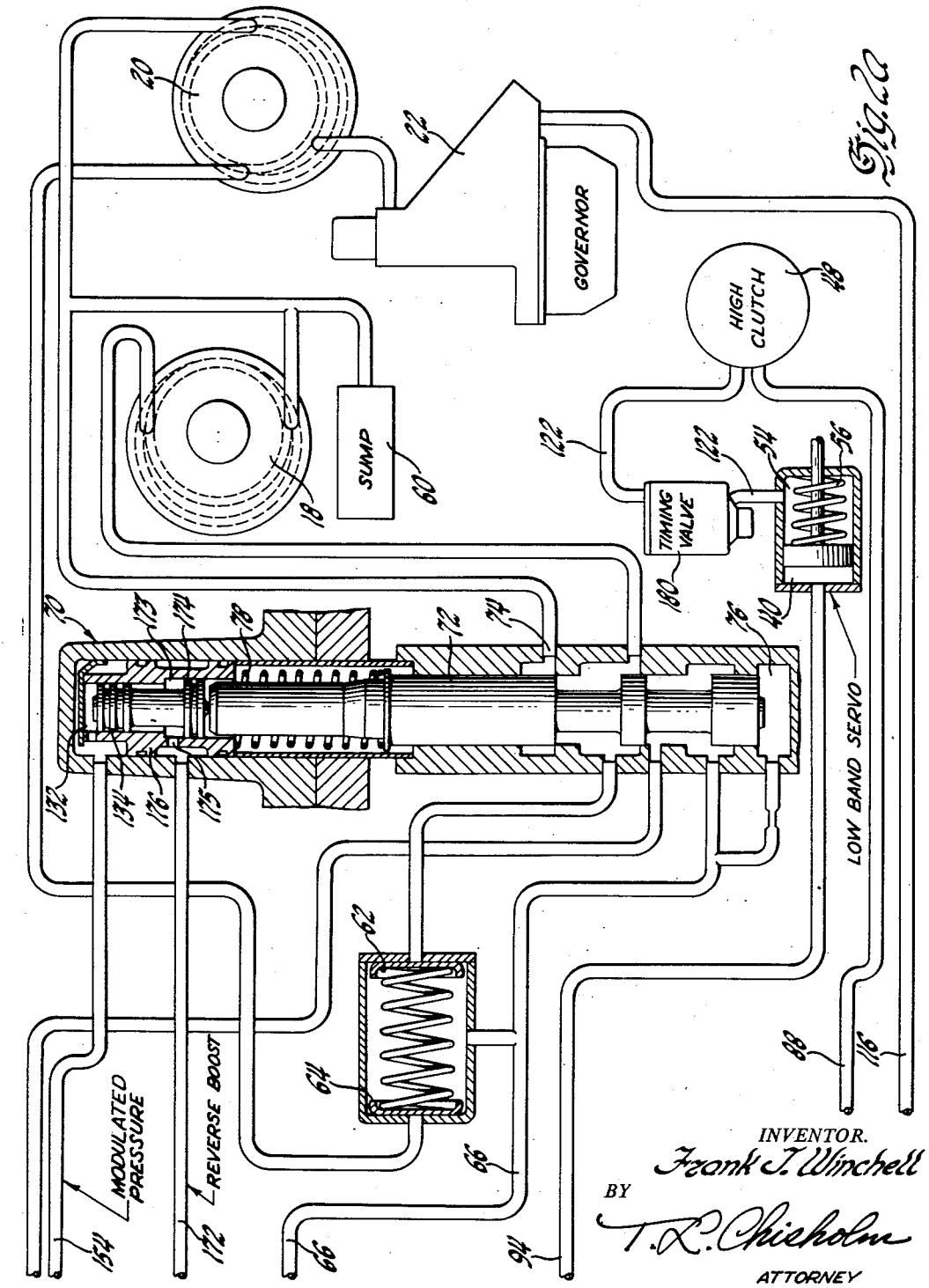

3,003,368
TRANSMISSION
Frank J. Winchell, Bloomfield Hills, Mich., assignor to General Motors Corporation, Detroit, Mich., a corporation of Delaware
Filed Sept. 18, 1957, Ser. No. 684,790
8 Claims. (Cl. 74—752)

This invention relates to the transmissions which are to be driven by a driving means, for example an internal combustion engine, and which have pressure-operated friction torque-establishing devices for establishing power trains to drive an output element at varying torque and speed with relation to the driving means.

In general, the objects of the invention include the provision of an improved pressure control system for such transmissions, which control increases the pressure of the system as the torque demand on the driving means increases, and reduces the pressure of the system with increasing speed of the output element, and makes it impossible to reduce the pressure below a predetermined value no matter how much the speed of the output element increases. More specific objects of the invention will be apparent as the description proceeds.

In the accompanying drawings:

FIG. 1 is a schematic representation of one form of transmission to which the present invention is applicable, FIGS. 2 and 2A collectively form a hydraulic diagram of a control system embodying one form of the invention, and FIG. 3 is a section of a timing valve.

Referring to FIG. 1, a torque converter designated as a whole by 12 is rotated by any suitable driving means represented by 10, which may be the crankshaft of an internal combustion engine, not otherwise shown. The torque converter 12, through planetary reduction and reverse gearing 14 drives an output element or shaft 16 which may be the propeller shaft of an automobile. The driving means continuously drives a front pump 18 which constitutes a source of control oil under pressure whenever the engine is running, and the output shaft 16 drives a rear pump 20 which constitutes a source of control oil under pressure whenever the car is moving forward. A governor 22 is driven by the output shaft for influencing the pressure of control oil in the system according to the speed of the output shaft.

The converter 12 drives a converter output shaft 24 which is the input element or shaft for the planetary gearing 14. This shaft drives an input sun gear 26 meshing with long planet gears 28 only one of which is shown in the drawings. The long planet gears mesh with short planet gears 30, only one of which is shown in the drawing. All of the planet gears are mounted on a carrier 32 which drives the output shaft 16. The short planets 30 mesh with a reverse reaction ring gear 34 and with a low-speed forward reaction sun gear 36. The long planets do not mesh with the ring gear. Forward drive at reduced speed is established by holding the reaction sun gear 36, for example by means of a friction torque-establishing device such as band 38, which can be set by an expansible pressure chamber 40 to hold a drum 42 fixed to the sun gear 36. Direct forward drive between the shaft 24 and shaft 16 is established by connecting the sun gear 36 to the sun gear 26 to lockup the planetary gear set, which may be done by a friction torque-establishing device such as clutch 44, one side of which is fixed to the drum 42 and the other side of which is fixed to the shaft 24. The clutch may be engaged by an annular piston 46 actuated by an annular expansible pressure chamber 48. Reverse drive may be established by holding the reaction ring gear 34, for example by means of a band 50 which may be actuated by a piston in an expansible pressure chamber 52. Preferably, the direct clutch chamber 48 is connected to a low band release chamber 54 on the other side of the piston so that actuating pressure may always be applied to the chamber 40, but whenever it is desired to establish direct drive the pressure in the clutch chamber 48 acting in the chamber 54 equalizes the pressure on the low band piston so that a spring 56 releases the low band.

Clutch 44 and the bands 38 and 50 are known forms of friction torque-establishing devices, each of which establishes a power train through the transmission, either by directly connecting two relatively rotatable parts such as sun gears 26 and 36, or by sustaining torque in a reaction member as do the bands 38 and 50.

Transmissions as exemplified in FIG. 1 may be controlled by the hydraulic control system schematically shown in FIG. 2. The pumps 18 and 20 take in oil from a sump or reservoir 60 and discharge oil through check valves 62 and 64, respectively, to a main line 66, the pressure in which is controlled by a main pressure regulator 70 including a valve stem 72 urged upward to open an exhaust port 74 leading to the sump 60 by the pressure of oil in the main line acting in a regulating chamber 76, and urged down to close the exhaust port by a spring 78. The regulator, as so far described, tends to maintain a constant pressure in the main line 66 the value of which is determined by the spring, as is known.

Control oil from the main line 66 is selectively directed to the various torque-establishing devices by a manual selector valve 80 having a valve stem 82 with or without the cooperation of an automatic shift valve 84. When the selector valve stem 82 is in the park position marked P in FIG. 2 the main line 66 is shut off from all clutch and band apply lines by lands 86 and 87. Clutch apply chamber 48 is vented through the direct clutch apply conduit 88 leading to the exhaust port 90 of the shift valve 84. The low band apply chamber 40 is vented through the low band apply conduit 94 at exhaust port 96 of the selector valve 80. The reverse band apply cylinder 52 is vented through the reverse apply line 100 at exhaust port 102 of the manual selector valve. Consequently, no power train can be established through the transmission. When the manual valve stem 82 is in neutral position marked N, main line 66 is closed by land 86 and all of the apply lines for the torque-establishing devices are vented, as described in connection with the P position. In addition a main line branch conduit 92 leading from the manual valve 80 to the supply port 106 of the shift valve 84 is vented between lands 86 and 104 at exhaust port 96 so that if the car is coasting in neutral and the shift valve 84 should be operated to close the vent 90 the high clutch apply line 88 will be vented at port 96.

To establish and maintain forward drive at a reduced speed ratio the manual valve stem 82 is placed in the low position marked L in FIG. 2. This directs oil from the main line 66 between lands 86 and 104 to the low band apply conduit 94. The reverse apply line 100 remains vented at exhaust port 102 and the direct clutch apply line 88 remains vented at exhaust port 90 of the shift valve 84 and the conduit 104 remains vented at exhaust port 96. Consequently, the transmission will drive the car at the reduced speed ratio of the planetary gearing 14.

To drive the car in either low speed ratio or high speed ratio, as may be required by torque and speed conditions, the manual valve stem 82 is placed in the automatic drive position marked D as shown in FIG. 2. In this position exhaust port 96 is closed by land 104, the reverse apply line 100 remains vented at the exhaust port 102, and oil is directed from the main line 66 between lands 86 and 104 to the low clutch apply line 94. This starts the car in low gear. In addition control oil is supplied from the main line 66 between lands 86 and 104 by the branch line 92 to the inlet port 106 of the shift valve 84 so as to be able to supply the high clutch chamber 48 whenever the shift valve is opened. The transmission can be automatically shifted between high gear and low gear by the shift valve 84 which is jointly controlled by the governor 22 and by the torque demand on the input shaft, as will now be described.

The shift valve 84 includes a valve stem 110 which can direct main line pressure from conduit 92 to the high clutch apply line 88 or can close the conduit 92 at inlet port 106 and vent the high clutch line 88 at exhaust port 90. In FIG. 2 the shift valve 84 is shown in the closed position just described in which the high clutch is vented at exhaust port 90, which is the position of low gear drive. The valve stem 110 is urged to the right to close port 106 and open exhaust port 90 by a spring 112 and is urged to the left to open port 106, close exhaust port 90 and thus establish direct drive by the pressure of oil in an upshift chamber 114 derived from the governor 22 through the governor line 116 in which the pressure is a function of forward speed of the vehicle. The valve stem 110 is also urged to the right to close the port 106 and establish low gear drive by pressure of oil in a throttle chamber 118 in which is maintained a pressure which is the function of the amount of opening of the usual fuel control device of the engine. This is effected by a throttle valve 120, as is known.

When the shift valve 110 is moved to the left to open port 106 the exhaust port 90 is closed and oil at main line pressure is supplied from port 106 to the high clutch apply line 88 and the high clutch apply chamber 48. Oil also flows from the chamber 48 through the conduit 122 to the low band release chamber 54 where it balances the pressure in the low band apply chamber 40 so that the spring 56 releases the low band. When the shift valve is in the position shown in FIG. 2 the direct clutch apply chamber 48 and low band release chamber 54 are vented at port 90 and the transmission is in low gear.

Governor pressure, representing the speed of the car, tends to shift the transmission into high and throttle pressure representing torque demand on the engine opposes shift into high and can even overcome governor pressure to shift the transmission into low. Therefore, when the manual valve is placed in D position the transmission will either be in low gear or high gear, according to the speed of the car and the torque demand on the driving means, as is known.

Whenever the manual valve is set for reverse, the exhaust port 102 is closed by land 87 and the reverse apply line 100 is filled with oil under pressure between lands 86 and 87 and this fills reverse apply chamber 52.

The transmission as so far described is known. It has been proposed in such transmissions to increase the pressure maintained by the regulator valve as the torque demand on the engine increases, in order to increase the holding power of the torque-establishing devices when high torque is required. It has also been proposed to decrease the pressure maintained by the regulator valve as the speed of the car increases. This has involved two opposing controls, one tending to increase the pressure and the other tending simultaneously to decrease the pressure. While this tends to maintain a pressure which is the resultant of both control conditions it has the disadvantage that at high speeds the reducing control can exceed the pressure increasing control and so reduce the standard minimum pressure normally maintained by the regulating device such as the spring 78 of the regulating valve 70. This has the result that at high speeds normal pressure cannot be maintained in the control system, which results in slipping of the friction torque-establishing devices.

Therefore, it is one of the specific objects of this invention to provide an improved means and method of increasing the pressure of the control system as the torque demand on the driving means increases, to provide an improved means and method of decreasing the pressure as the speed of the car increases, to provide an improved arrangement whereby the amount of correction applied by the speed-responsive device cannot exceed the amount of correction applied by the control which is responsive to torque demand. Thus by this invention, under no circumstances can the pressure be less than a prescribed minimum predetermined pressure normally maintained by the regulator in the absence of the speed and torque controls. Specifically, it is an object of the invention to provide means for eliminating the action of the speed-responsive control whenever the car reaches a predetermined high speed. More specifically, it is an object to adjust the control pressure by means of a device which supplies to the main regulator valve a positive modulating pressure, to increase this modulating pressure as torque demand increases, to decrease the modulating pressure as speed increases and to eliminate the modulating pressure when the car reaches a predetermined high speed.

In achieving these objects I provide a second pressure regulator valve or modulator valve 130 which supplies to a modulating chamber 132 in the main regulator valve 70 a pressure which increases as the torque demand on the driving means increases, which modulating pressure urges a piston 134 downward as FIG. 2 is seen and adds its force to the force of the spring 78 to increase the pressure in the regulating chamber 76 which is required to crack the vent port 74 and thus increase the pressure maintained by the regulator valve 70 as the torque demand increases. The modulator valve 130 includes a valve stem 136 urged to the right, as FIG. 2 is seen, by a force which in any suitable known manner, is caused to increase as the torque demand on the engine increases. This may be done for example by a spring 138 acting on a flexible diaphragm 140 exposed on its right side to the pressure of the atmosphere and exposed on its left side to the pressure in the induction manifold of an internal combustion engine which drives the shaft 10, which induction pressure is maintained in a closed chamber 142, one side of which is formed by the diaphragm 140 and which is connected to the induction manifold of the engine. The force on the valve stem tends to close a vent port 144 and to open an inlet port 146 which is connected by a conduit 148 to the manual valve 80 so that the inlet port can be supplied with main line pressure whenever the manual valve is in any drive position, that is low (L), automatic (D) and reverse (R). The valve stem 136 is urged to close the inlet port 146 and open the exhaust port 144 by the pressure in a modulating chamber 150 connected to a modulated pressure chamber 152 from which oil can be vented by port 144 and to which oil is admitted by the inlet port 146. The modulated pressure chamber 150 is connected by conduit 154 to the previously mentioned modulating chamber 132 of the main pressure regulator valve 70.

The modulator valve constitutes a source of pressure (in the chamber 152) which increases as the torque or power demand on the driving means increases. When this pressure is low (engine vacuum is high) pressure of the oil in the chamber 132 acting in the chamber 150 can close the inlet port 146 at a relatively low value to maintain a low pressure in chamber 132. If this pressure tends to exceed this value it moves the valve stem 136 to close the inlet port 146 and open the vent port 144 to relieve pressure in the chamber 132; and if the pressure in the chamber 132 falls, the absolute pressure in the manifold and the spring 138 move the valve stem to close the exhaust port 144 and crack the inlet port 146 tending to increase the pressure in the chamber 132. Thus the pressure in the main line 66 is modulated or varied as torque demand on the engine changes. The modulator may be set to provide little or no pressure in the chamber 132 when the throttle is closed so that the main regulator valve 70 maintains a pressure of 90 pounds, for example. The modulator may increase the pressure in chamber 132 at high torque demand occurring in connection with wide open throttle to a value which will increase main line pressure to 250 pounds per square inch, for example.

In order to offset the increasing pressure of the main line as speed of the vehicle increases, I provide a pressure-reducing chamber 160 in the modulator valve 130 which pressure-reducing chamber is connected by a conduit 162 to the governor line 116. The pressure chamber 160 may be conveniently formed between a relatively large diameter land 164 on the valve stem 136 and a relatively small diameter land 166. Due to the difference in areas of these lands the resultant force of the pressure of the governor in chamber 160 urges the valve stem 136 to the left and the value of this resultant force is measured by the speed of the vehicle. Thus the speed of the vehicle opposes torque demand on the engine in generating pressure in the modulating chamber 132 of the main regulator valve 70, and as torque demand increases at a constant speed the pressure in the main line 66 will be increased and as speed increases the pressure in the main line 66 will tend to decrease.

Any suitable or known governor may be used which provides the desired pressures at particular speeds, for example the governor disclosed in British Patent 726,740, published March 23, 1955.

It is important that the pressure of the main line 66 can never be reduced below a minimum pressure which is maintained by the spring 78 in the absence of other influences. At high torque demand the modulating pressure generated by the modulator 130 in the modulating chamber 132 can increase main line pressures such as 250 pounds, if the car is moving slowly. This pressure of the main line will be reduced by the governor pressure acting in chamber 160 as car speed increases. At some predetermined speed the force applied by the governor to the modulator valve stem can exceed the force applied by the spring 138 and diaphragm 140. This excess automatically prevents the modulator from affecting the regulator valve 70 because it moves the modulator valve stem 136 to the left far enough to close the inlet 146 and open exhaust port 144. This will reduce the pressure in the modulating chamber 132 to zero and prevent the modulator from functioning. This includes removal of the speed-responsive correction, leaving the regulator valve 70 to regulate the pressure in the main line 66 to the constant value determined by the spring 78.

The modulator valve 130 and the governor 22 can be proportioned and calibrated to give any desired values of pressure in the main line 66 in accordance with speed and torque demand and to have the governor close the inlet port 146 of the modulator valve, as above described, at any predetermined speed of the vehicle as may be found desirable.

It may be desirable to have the main line pressure modulated when the transmission is set for automatic drive, that is with the manual valve stem 82 in the D position and to prevent modulating of main line pressure when the transmission is in low, under which conditions high torque is frequently demanded. Ths is accomplished by connecting the vent port 144 through a conduit 170 to the manual valve 80 so that the conduit 170 is connected to the vent port 102 and is vented when the transmission is set for automatic drive. When the transmission is set for low gear the conduit 170 is cut off from the vent port 102 by land 86 and main line pressure is directed from conduit 66 into the exhaust port 144 of the modulator. Therefore the modulator will direct main line pressure to the chamber 132 and this will act as a constant-value pressure-boosting chamber to increase the level of pressure maintained by the regulator valve 70 and to prevent fluctuation of this pressure with speed or torque demand. For example, if torque demand increases the inlet port 146 will be open to admit line pressure to the chamber 132 and this line pressure will remain in the chamber 132. If this pressure is sufficient to move the valve stem 136 to the left to open the exhaust port 144, line pressure may be cut off at port 146 but will simultaneously be maintained in the chamber 132 by the exhaust port 144 which is connected to main line 66.

If it is desired to increase the range of pressure maintained by the regulator 70 in reverse, the reverse apply line 100 is connected by a branch conduit 172 to a pressure-boost chamber 173 which may be formed between the piston 134 and a piston 174 of larger diameter on the same stem. Whenever the reverse line 100 is pressurized oil flows through conduit 172 and a passage 175 in a liner 176 to chamber 173 to add its force to the spring 78 to increase the pressure maintained by the regulator 70. As so far described this arrangement will modulate line pressure in reverse according to speed and torque demand, but in a higher range than in automatic forward drive.

It may be desirable to prevent modulation in reverse in which case the conduit 172 is omitted. If this is done it may be desirable to increase the pressure and maintain it constant, as in low. When this is desired the modulating chamber 132 of the regulator 70 is pressurized at line pressure in reverse by blocking the vent 102 when the manual valve 82 is set for reverse. As shown in FIG. 2, land 87 will block exhaust port 102 and main line pressure will be supplied to modulator vent conduit 170 from main line 66 between lands 86 and 87, similar to the condition in low.

In order to time the relative application and release of the direct clutch 44 and the low band 38 there is incorporated in the line 122 which connects the high clutch apply chamber 48 and the low band release chamber 54 a timing valve 180. This may be constructed, as shown in U.S. Patent 2,766,639 or as shown in FIG. 3 in which a sheet metal shell 181 is formed to include a valve seat 182 and a spring retainer 183 for a spring 184 which seats a valve 185 against the seat 182. The shell 181 has openings 186 and 187 which can permit unrestricted flow through the shell. The valve shell 185 is formed into a spring retainer 188 for a second spring 189 which seats a ball valve 190 against a second valve seat 191 formed in the retainer 188 and having a restricted bypass 192. When the high clutch is to be applied and the low band is to be released, pressure in the clutch chamber 48 unseats the ball valve 190 against the light spring 189 and control oil flows unrestrictedly to the low band release chamber 56 to release the low band quickly. On downshift from direct drive to low gear ratio it is desired to have the low band take up any slack quickly and thereafter apply pressure gradually to the drum 42. When the pressure is released from the clutch apply chamber by the shift valve 84, the pressure in the low band release chamber 56 unseats the valve 185 against the relatively heavy spring 184 and permits unrestricted flow as long as the pressure in the low band release chamber 56 is a predetermined amount, such as 30 pounds, greater than the pressure in the clutch apply chamber 48. When this pressure differential drops below the predetermined value, the heavy spring 184 seats the valve 185 leaving the restricted by pass 192 as the only path through which oil can flow from the low band release chamber. The instant of closing the valve 185 is preferably timed to occur when the band 38 just begins to apply pressure to the drum 42. Thereafter oil flowing slowly through the orifice 192 restricts the rate of application of the band and so allows the band to be applied gradually to the drum 42, thus cushioning the downshift.

I claim:

1. A transmission comprising in combination driving means, a rotatable input member connected to the driving means, an output member, a friction torque-establishing device for establishing a driving connection between the members, a source of pressure fluid, a fluid pressure actuator which can be connected to the source for operating the friction torque-establishing device, a pressure-responsive regulator for controlling the pressure of the source, supply means for supplying to the regulator fluid at a pressure which increases as torque demand on the driving means increases and thereby tends to increase the pressure of the source with increasing torque demand, and means continuously effective on said supply means for reducing, as a function of increase of speed of rotation of the output member, the pressure of the fluid so supplied to the regulator.

2. A transmission comprising in combination driving means, a rotatable input member connected to the driving means, an input member, a friction torque-establishing device for establishing a driving connection between the members, a source of pressure fluid, a fluid pressure actuator which can be connected to the source for operating the friction torque-establishing device, a pressure-responsive regulator for controlling the pressure of the source, a pressure-responsive modulator for supplying to the regulator fluid at a torque-demand pressure which increases as the torque demand on the driving means increases and thereby tends to increase the pressure of the source with increasing torque demand, and means for supplying to the modulator pressure fluid which continuously opposes said torque demand pressure and which increases as a function of increasing speed of rotation of the output member so as to reduce, as a function of increase of speed of rotation of the output member, the pressure of the fluid so supplied to the regulator.

3. A transmission comprising in combination driving means, a rotatable input member connected to the driving means, an output member; a friction torque-establishing device for establishing a driving connection between the members; a source of pressure fluid; a fluid pressure actuator which can be connected to the source for operating the friction torque-establishing device; a pressure-responsive regulator for controlling the pressure of the source, the regulator including a valve urged in one direction by a spring and in the opposite direction by the pressure of the source, and an expansible fluid pressure chamber for urging the valve in said one direction; a modulator for supplying to said expansible chamber of the regulator fluid at a pressure which increases with increasing torque demand on the driving means; and means continuously effective on said modulator for reducing the pressure in said expansible chamber with increasing speed of the output shaft.

4. A transmission comprising in combination driving means, a rotatable input member connected to the driving means, an output member; a friction torque-establishing device for establishing a driving connection between the members; a source of pressure fluid; a fluid pressure actuator which can be connected to the source for operating the friction torque-establishing device; a pressure-responsive regulator for controlling the pressure of the source, the regulator including a valve urged in one direction by a spring and in the opposite direction by the pressure of the source, and an expansible fluid pressure chamber for urging the valve in said one direction; a pressure-responsive modulator for supplying to said expansible chamber of the regulator fluid at a pressure which increases with increasing torque demand on the driving means; and means continuously effective on the modulator for supplying to the modulator fluid at a pressure which increases as a function of increasing speed of rotation of the output member so as to reduce the pressure in said expansible chamber with increasing speed of the output shaft.

5. A transmission comprising in combination driving means, a rotatable input member connected to the driving means, an output member; a friction torque-establishing device for establishing a driving connection between the members; a source of pressure fluid; a fluid pressure actuator which can be connected to the source for operating the friction torque-establishing device; a pressure-responsive regulator for controlling the pressure of the source, the regulator including a valve member urged in one direction by a spring and urged in the opposite direction by the pressure of the source and an expansible fluid pressure chamber for urging the valve in said one direction; a modulator adapted to supply to said expansible chamber fluid at a pressure which increases as torque demand on the driving means increases, said modulator including a valve member urged to open a connection between the source and said expansible chamber by a force which increases as torque demand increases and urged to interrupt said connection by the pressure of the fluid in the expansible chamber, and a second expansible fluid pressure chamber for urging the modulator valve member to interrupt said connection; and means for continuously supplying to said second chamber fluid under a pressure which increases a function of increasing speed of rotation of the output member.

6. A transmission comprising in combination driving means, a rotatable input member connected to the driving means, an input member, a friction torque-establishing device for establishing a driving connection between the members, a source of pressure fluid, a fluid pressure actuator which can be connected to the source for operating the friction torque-establishing device, a pressure regulator for controlling the pressure of the source, a modulator for increasing the pressure of the source as torque demand on the driving means increases, and means responsive to the speed of rotation of the output member for preventing the modulator from influencing the regulator when the speed of the output member is above a predetermined amount.

7. A transmission comprising in combination driving means, a rotatable input member connected to the driving means, an output member, a friction torque-establishing device for establishing a driving connection between the members; a source of pressure fluid, a fluid pressure actuator which can be connected to the source for operating the friction torque-establishing device, a pressure-responsive regulator for controlling the pressure of the source, means for supplying to the regulator fluid at a pressure which increases as torque demand on the driving means increases and thereby tends to increase the pressure of the source with increasing torque demand, and means responsive to the speed of rotation of the output member for interrupting the supply of pressure fluid from said first-mentioned means to the regulator when the speed of the output member exceeds a predetermined amount.

8. In a transmission comprising in combination driving means, a rotatable input member connected to the driving means, an output member, a friction torque-establishing device for establishing a driving connection between the members, a source of pressure fluid, a fluid pressure actuator which can be connected to the source for operating the friction torque-establishing device, a pressure regulator for controlling the pressure of the source, means for increasing the pressure of the source as torque demand on the driving means increases, and pressure-reducing speed-responsive means for reducing the pressure of the source as a function of increase of speed of the output member and responsive to a predetermined high speed of the output member for preventing reduction of pressure by the speed-responsive pressure-reducing means.

References Cited in the file of this patent

UNITED STATES PATENTS

| | | |
|---|---|---|
| 2,770,148 | Wayman | Nov. 13, 1953 |
| 2,903,910 | Carnegie | Sept. 15, 1959 |

UNITED STATES PATENT OFFICE
CERTIFICATE OF CORRECTION

Patent No. 3,003,368                      October 10, 1961

Frank J. Winchell

It is hereby certified that error appears in the above numbered patent requiring correction and that the said Letters Patent should read as corrected below.

Column 5, line 59, for "Ths" read -- This --; column 7, line 13, for "input" read -- output --; column 8, line 18, after "increases" insert -- as --; line 23, for "input" read -- output --.

Signed and sealed this 10th day of April 1962.

SEAL)
Attest:

ERNEST W. SWIDER
Attesting Officer

DAVID L. LADD
Commissioner of Patents